Aug. 5, 1969 F. MICHELS ET AL 3,459,889

ARRANGEMENT FOR PROTECTION OF A CAMERA TUBE

Filed July 20, 1966

Inventors:
Friedrich Michels
Horst Zschau

By Michael S. Striker
Atty

United States Patent Office 3,459,889

Patented Aug. 5, 1969

3,459,889

ARRANGEMENT FOR PROTECTION OF A CAMERA TUBE

Friedrich Michels and Horst Zschau, Darmstadt, Germany, assignors to Fernseh G.m.b.H., Darmstadt, Germany Filed July 20, 1966, Ser. No. 566,673
Claims priority, application Germany, July 21, 1965, F 46,663
Int. Cl. H01j *29/89;* H04n *5/38;* G02f *1/36*
U.S. Cl. 178—7.92 11 Claims

ABSTRACT OF THE DISCLOSURE

An arrangement for preventing high intensity illumination reaching the light-sensitive element of a television camera tube. The object to be picked up by the camera tube is imaged by an optical imaging system onto the light-sensitive tube element. A photochromic light filter is arranged between the optical imaging system and the television camera tube. The photochromic filter automatically diminishes the amount of light transmitted through the filter, when a high intensity area becomes illuminated on the filter. The process is reversible and such that only the high intensity illuminated area on the filter decreases the proportion of light transmitted, whereas the remaining filter area not subjected to high intensity illumination transmits a greater proportion of the impinging light.

Figure 1:
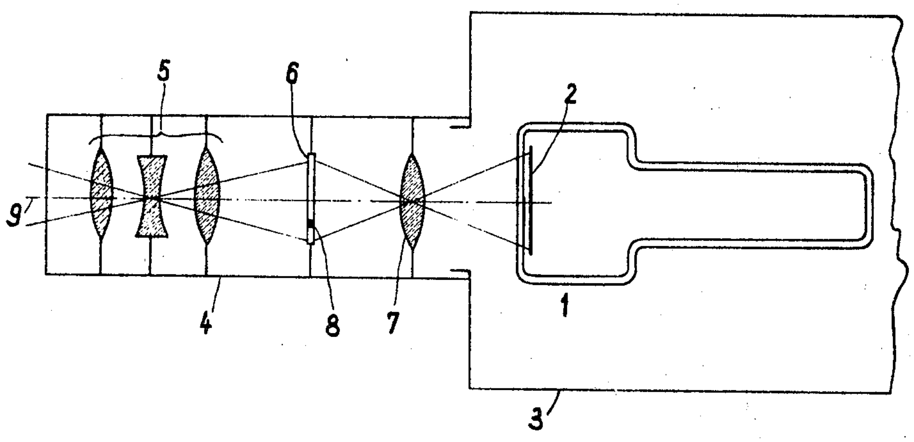

The present invention relates to an arrangement for the protection of camera tubes against the effects of intense light rays, and in particular, for the protection of the photocathode of an image orthicon tube against the rays of the sun.

It is well known in the art of television communications, that the direct rays of the sun or of other very bright light sources introduce disturbances in the pictures televised. Under special circumstances, these direct rays may even operate to destroy the photocathode of the orthicon camera tube being used. In order to avoid such damaging effects, television cameras are commonly arranged so that they are not within the path of direct sun light. In the event that the television cameras are not firmly mounted in place, however, it is generally not possible to predict from which direction the direct rays of the light source originate.

Accordingly, it is an object of the present invention to provide a plate of photochromic material, which is positioned in the path of the light rays and between the object and the camera tube.

Another object of the present invention is to provide a protective plate, as set forth, which is positioned within the vicinity of an image plane associated with the optical projection system of the television camera.

Yet another object of the present invention is to provide a protective plate, of the character described, which is made of transparent material that darkens under the influence of light and regains its clearness in the absence thereof.

Still another object of the present invention is to provide a protective plate, as set forth, which is made of glass containing compounds of silver halides.

A further object of the present invention is to provide a protective plate, of the character described, capable of transmitting freely ultraviolet light rays.

A yet further object of the present invention is to provide a protective plate, as set forth, operating in conjunction with cooling media to prevent heat rays from impinging upon the photocathode of the television camera tube.

A still further object of the present invention is to provide a protective system for television camera tubes, as set forth, which operates in a fully automatic manner and requires no attending personnel.

With the preceding objects in view the invention comprises of an arrangement including a camera tube sensitive to light rays and a housing for same, a projection system secured to the housing for projecting upon the camera tube an image of the field of vision thereof, and a protective plate mounted in the path of the light rays between the projection system and the camera tube. Suitable cooling media may be provided in conjunction with the protective plate to prevent heat rays from impinging upon the photocathode of the camera tube when the plate is located in close proximity thereof.

Figure 2:
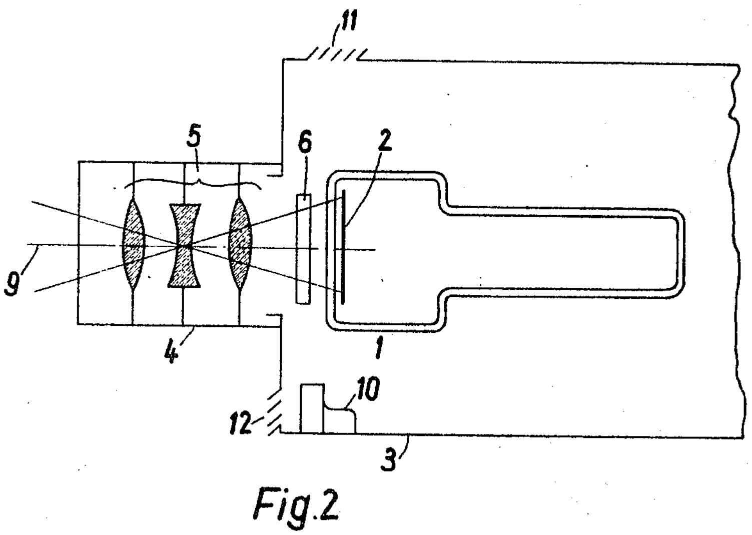

The novel features which are considered as characteristic for the invention are set forth in particular in the appended claims. The invention itself, however, both as to its additional objects and advantages thereof, will be best understood from the following description of specific embodiments when read in connection with the accompanying drawings, in which:

FIG. 1 is an optical diagram showing the relationship between the camera tube, projection system, and the protective plate when the latter is mounted within the projection system; and FIG. 2 is an optical diagram showing the relationship of the camera tube, projection system and the protective plate when the latter is mounted in close proximity of the camera tube.

Referring to the drawing and to the embodiment of FIG. 1, an image orthicon camera tube 1 is provided with a photo cathode 2 in the vicinity of its frontal area. The camera tube 1 is mounted within a housing 3 and operates in conjunction with a projection system 4 secured to the housing. The projection system 4 includes a primary lens arrangement 5 which is designed to produce an image of the object at the location 6. This intermediate image formed at the location 6 is projected upon the plane of the photo cathode 2 by way of the lens 7. Mounted at the location or plane 6, is a light sensitive plate which functions so that when, for example, the image of the sun is formed at the position 8, the plate becomes darkened very rapidly at the area 8 against which the sun rays strike. In this manner the intensity of the rays of the sun are considerably reduced, and only a small portion of the sun light is projected upon the photocathode 2. By being thus protected from the high intensity rays of the sun, the photocathode cannot become damaged thereby.

The main lens arrangement 5 may be of any suitable form whereby the image of an object may be projected upon the plate 6. One such arrangement as shown in FIG. 1 comprises a concave lens interposed between two convex lenses. Such as arrangement is adaptable for achieving this particular object. Lens 7 on the other hand is also of the convex type. The optical axis of the projection system is designated by the reference numeral 9.

FIG. 2 illustrates an embodiment for the protection of camera tubes which does not form an intermediate image as in the arrangement of FIG. 1. In the configuration of FIG. 2, the light sensitive plate 6 is mounted within closed proximity of the camera tube 1 and hence photocathode 2. In view of the condition that the photocathode 2 is extremely sensitive to elevated temperatures, it is advisable to insulate the plate 6 from the photocathode so that heat from the plate 6 is not readily transferable onto the photocathode. The insulating of elements 2 and 6 from each other against such heat transfer may be accomplished, for example, by introducing a blast of air between the space prevailing between plate 6 and photocathode 2. By directing a continuous stream of air through such space it is possible to prevent overheating and damaging of the photocathode. A cooling airstream of this type may be generated by mounted a blower 10 opposite the space as shown in FIG. 2, and providing louvers 11 through the wall of the housing. The blower 10 can thus draw a continuous fresh supply of air through the louvers 12, also constructed within the housing wall 3, and discharge the air through the louvers 11 after the air stream has passed through the space between the plate 6 and photocathode 2.

It is also possible to accomplish the object of protecting the photocathode 2 from excessive heat by maintaining a cooling fluid within the space between the elements 6 and 2. Such a cooling fluid would prevent any heat transfer from the plate upon the photocathode 2 without interfering optically with the light rays directed against the camera tube. In this connection the plate 6 may be mounted within a frame enclosed by transparent walls and containing the cooling fluid. The cooling apparatus is thus made integral with the plate 6, and the mounting of the combination thereof, within the housing 3, is considerably simplified for the purpose of applying coding media to the plate 6. A more suitable construction for this particular cooling arrangement resides in the embodiment of FIG. 1 rather than FIG. 2. This is due to the condition that the embodiment of FIG. 1, more space is available between the plate 6 and the face of the camera tube 1. This additional space allows more freedom for the construction and mounting of the cooling media.

When the plate 6 is located precisely in the plane wherein an image of the object is formed by the projection system, as in FIG. 1 or FIG. 2, the plate 6 experiences a maximum heating effect due to the sun's image. At the same time the area surrounding the image of the sun is masked. Maximum heating of the plate 6 does not necessarily result in correspondingly maximum darkening of the plate. This is due to the condition that the chemically darkening process is partially reversible at higher temperatures. It is essential, therefore, that the plate 6 be mounted somewhat outside of the image plane. Accordingly, in FIG. 1, the plate 6 should be mounted somewhat to the left of the plane wherein the intermediate image is formed. In the embodiment of FIG. 2, on the other hand, the plate 6 should be mounted somewhat to the left of the plane of the photocathode 2. The amount by which the plate 6 is thus mounted outside of the image plane, however, is limited by the masking of the surrounding field of the sun. The plate 6 itself may be constructed of a glass pane containing, for example, compounds of the silver halides.

While the invention has been illustrated and described as embodied in a superorthicon camera tube arrangement, it is not intended to be limited to the details shown since various modifications and structural changes may be made without departing in any way from the spirit of the present invention.

Without further analysis the foregoing will so fully reveal the gist of the present invention that others can, by applying current knowledge, readily adapt it for various aplications without omitting features which from the standpoint of the prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A television camera arrangement including optical means for directing light rays from the object to be televised in a predetermined direction; a television camera tube arranged in said predetermined direction spaced from said optical means; light filtering means arranged between said optical means and said television camera tube, said light filtering means having a stronger light filtering action for light of strong intensity and a smaller light filtering aciton for light of smaller intensity; and cooling means for cooling said light filtering means, whereby an intensely illuminated area of said light filtering means transmits only a portion of the light impinging upon said intensely illuminated area and the remaining area of said light filtering means subjected to less illumination intensity transmits a substantially larger portion of the impinging light.

2. A television camera arrangement including optical means for directing light rays from the object to be televised in a predetermined direction; a television camera tube arranged in said predetermined direction spaced from said optical means; and light filtering means arranged between said optical means and said television camera tube, said light filtering means being in the vicinity of the image plane associated with said camera tube and having a stronger light filtering action for light of stronger intensity and a smaller light filtering action for light of smaller intensity, whereby an intensely lluminated area on said light filtering means transmits only a portion of the light impinging upon said intensely illuminated area and the remaining area of said light filtering means subjected to less illumination intensity transmits a substantially larger portion of the impinging light.

3. A television camera arrangement according to claim 2 wherein an image of said object is projected upon said light filtering means for transmission to said camera tube.

4. A television camera arrangement according to claim 3 including projection means interposed between said light filtering means and said camera tube to protect said image on said filtering means onto said camera tube.

5. A television camera arrangement according to claim 4 wherein said projection comprises a convex lens.

6. A television camera arrangement according to claim 2 including cooling means for cooling said light filtering means.

7. A television camera arrangement according to claim 2 wherein said camera tube is a image orthicon tube.

8. A television camera arrangement according to claim 2 wherein said optical means is a lens projection system.

9. A television camera arrangement according to claim 2 wherein said light filtering means includes silver halide ingredients.

10. A television camera arrangement according to claim 2 wherein said light filtering means is a glass pane containing compounds of silver halides.

11. A television camera arrangement according to claim 2 including a cooling fluid wherein said light filtering means is immersed for cooling same.

References Cited

UNITED STATES PATENTS

| | | | |
|---|---|---|---|
| 3,225,138 | 12/1965 | Montani | 178—7.2 |
| 3,270,639 | 9/1966 | Windsor | 95—10 |
| 3,277,238 | 10/1966 | Sharp et al. | 178—7.2 |
| 3,306,975 | 2/1967 | Donnay | 178—7.2 |

OTHER REFERENCES

"Silver Halide Microcrystals Are Basis For Photochromic Glass," Chemical and Engineering News, page 43, Feb. 3, 1964.

ROBERT L. GRIFFIN, Primary Examiner

ROBERT L. RICHARDSON, Assistant Examiner

U.S. Cl. X.R.

178—7; 350—160